United States Patent
Hollenberg

[11] 3,879,906
[45] Apr. 29, 1975

[54] TWO-MEMBER STRUCTURAL JOINT
[76] Inventor: Dennis D. Hollenberg, 1935 37th Pl., East, Seattle, Wash. 98112
[22] Filed: July 22, 1974
[21] Appl. No.: 490,251

[52] U.S. Cl. ............. 52/753 R; 52/753 D; 248/188
[51] Int. Cl. ............................................. F16b 9/02
[58] Field of Search .......... 52/753 R, 753 C, 753 D, 52/753 Y, 753 E, 753 G, 758 R, 758 D; 248/188; 403/387

[56] References Cited
UNITED STATES PATENTS

| 282,483 | 8/1883 | Baker | 52/753 D UX |
| 288,126 | 11/1883 | Shearman | 52/753 D |
| 706,763 | 8/1902 | Lange | 52/753 T X |
| 3,591,212 | 7/1971 | Rhyne | 52/753 D |

Primary Examiner—Werner H. Schroeder
Assistant Examiner—Wayne L. Shedd
Attorney, Agent, or Firm—Christopher Duffy

[57] ABSTRACT

One of the members is right angularly dadoed into a slot in an edge of the other member, and in addition is interlocked with the other member by a dovetail type tenon and mortise joint which prevents the one member from being disengaged from the other in the directions relatively outwardly of the slot.

10 Claims, 16 Drawing Figures

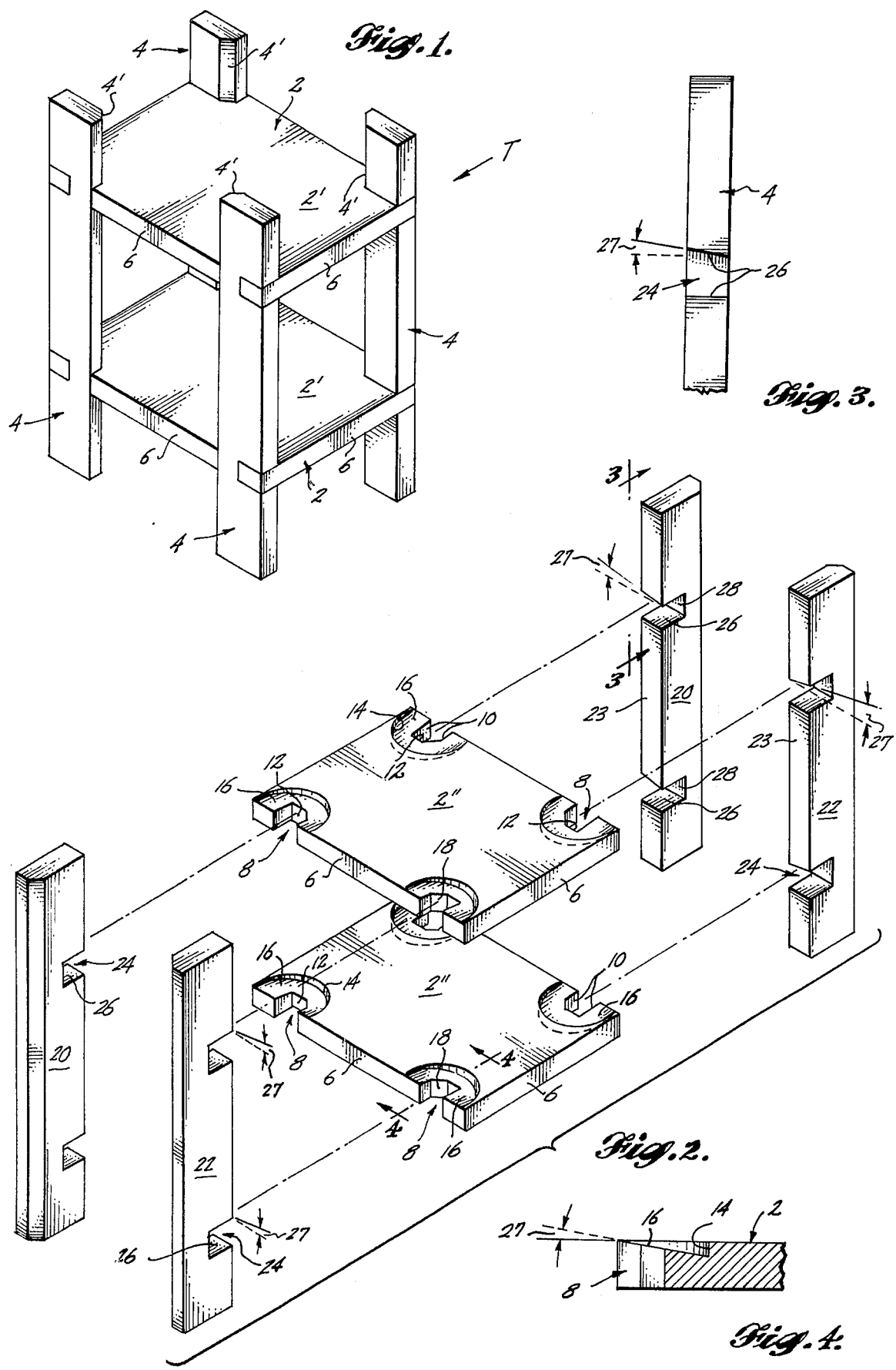

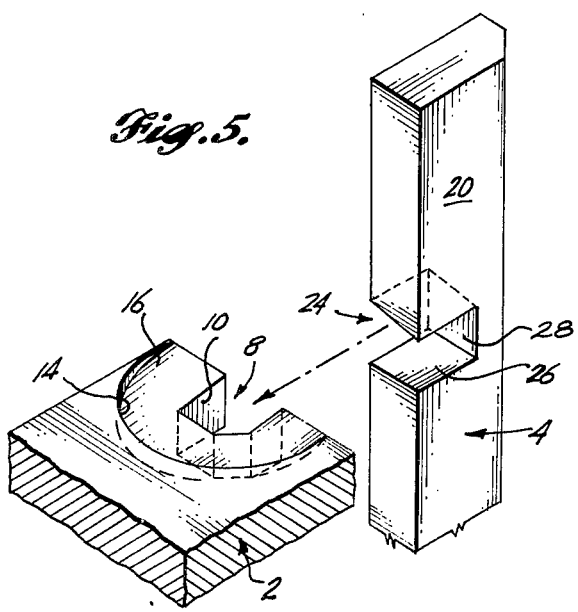
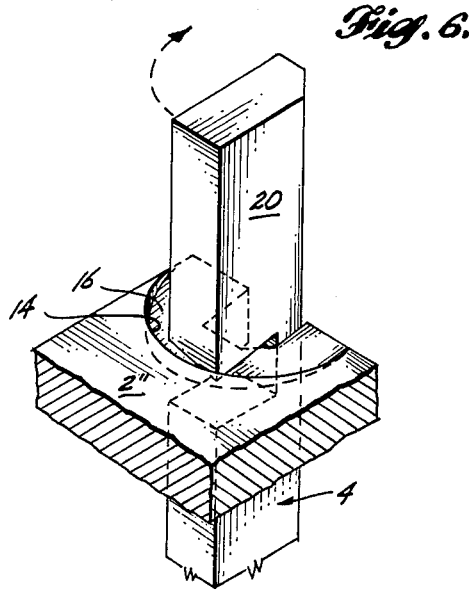
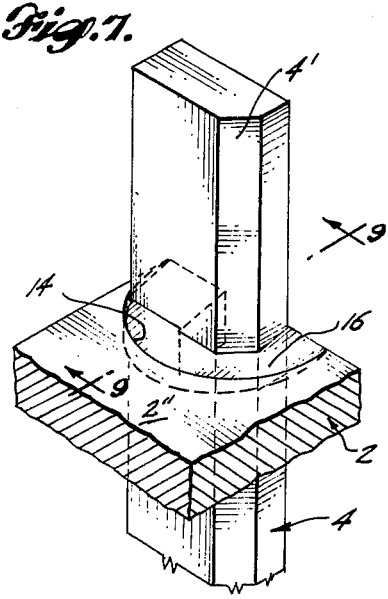
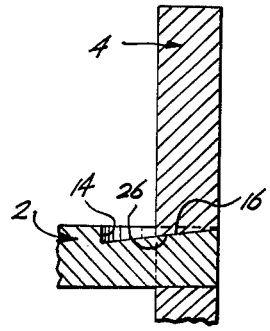
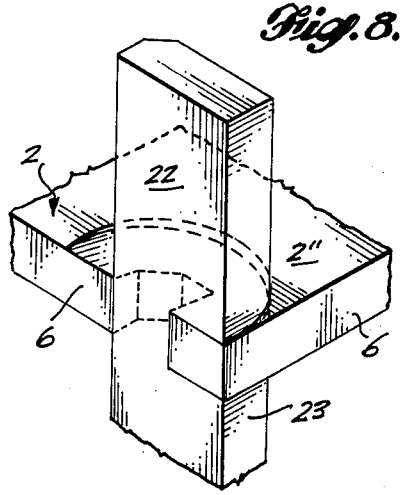
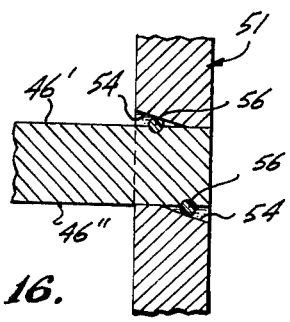
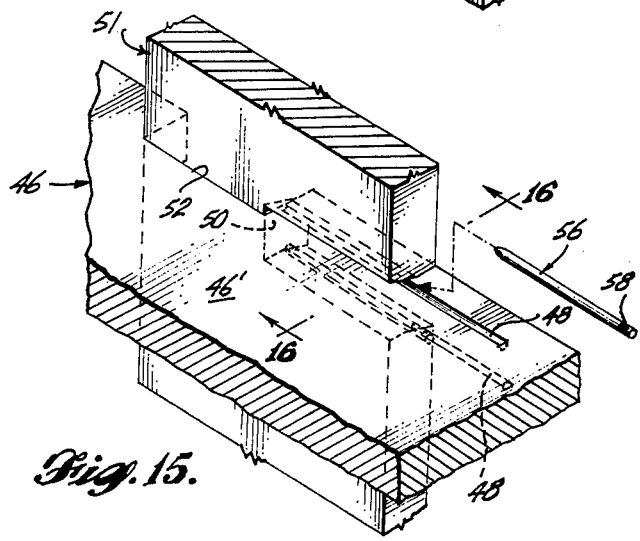

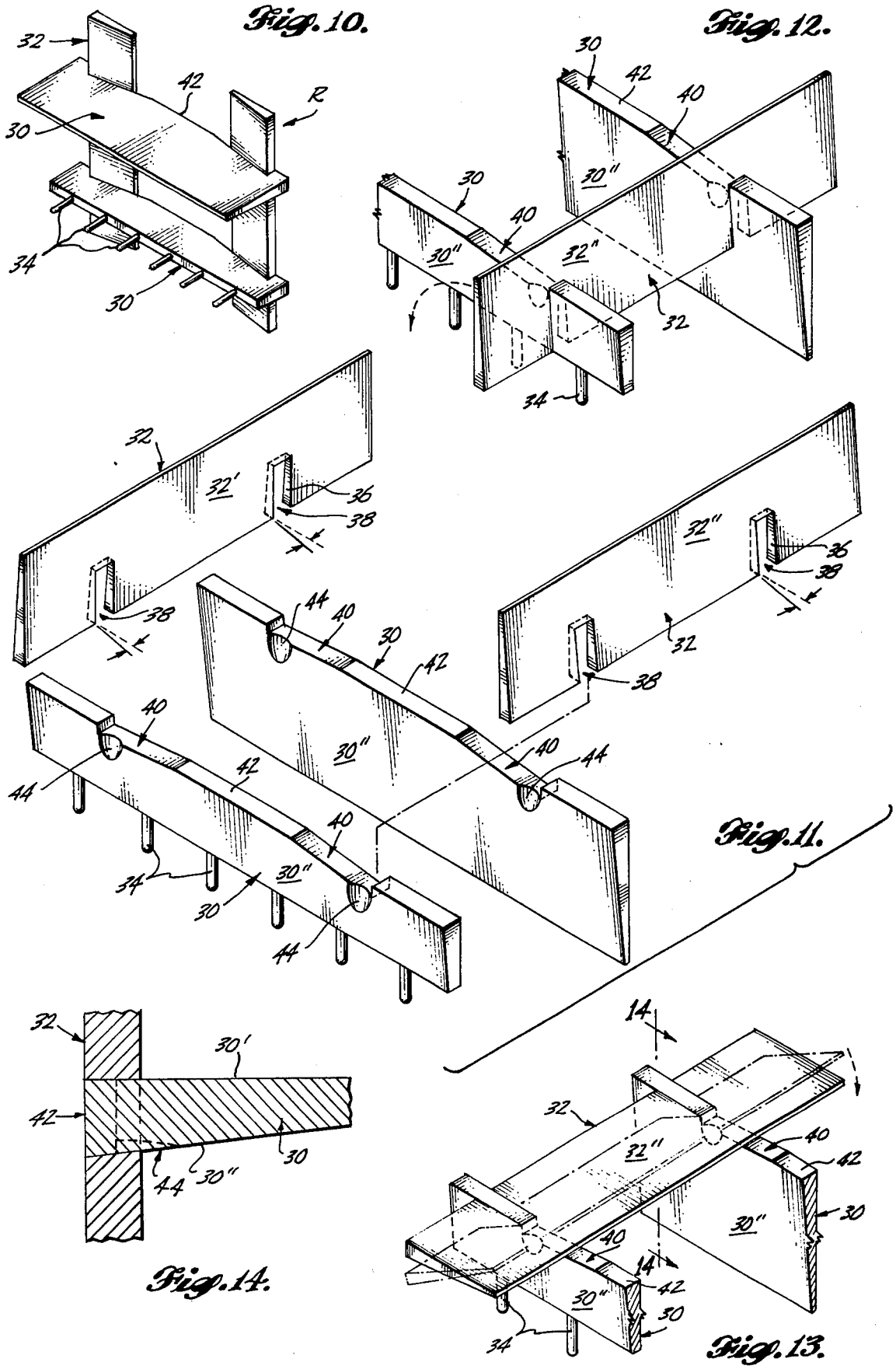

(3,879,906)

TWO-MEMBER STRUCTURAL JOINT

THE INVENTION IN GENERAL

This invention relates to a two-member structural joint, and in particular to a two-member structural joint in which one member is right angularly dadoed into a slot in an edge of the other member, and in addition is interlocked with the other member by a dovetail type tenon and mortise joint which prevents the one member from being disengaged from the other in the directions relatively outward of the slot. The joint has many uses, for example, in assembling containers and furniture. It is particularly useful in so-called knock-down structures, that is, structures which are rigid when assembled, yet capable of being rapidly disassembled when desired. The joint is simple and inexpensive to fabricate and can be fabricated in wood, plastic or any other structural material. It inherently produces a right angular relationship between the paired members and can bear a load in the plane of either member. Also, it produces a visually pleasing effect, as for example when it is embodied in furniture.

According to the invention, each of the structural members has oppositely disposed faces thereon which coterminate with one another at the outline of the member and define an edge of the member therebetween. Moreover, the edge of each member has a slot therein, the walls of which are disposed crosswise to the faces of the member and extend inwardly of the faces from the edge to the bottom of the slot. In the joint the members are disposed in right angularly related planes and the body of one member is engaged in the slot of the other member and has that edge portion of the other member which is disposed adjacent one wall of the slot therein, received in the slot of the one member. Additionally, there are means in the joint connecting the edge portion of the other member with the one member at the slot therein, whereby the one member cannot be disengaged from the other member in the directions outwardly of the slot in the other member. The connecting means may take the form of surfaces which are mutually opposed to one another on one wall of the slot in the one member, and on the edge portion of the other member, respectively, and which are mitered to the plane of the other member so that they taper relatively transversely inwardly of the body of the other member from points adjacent the edge thereof to points adjacent the bottom of the slot therein. Or alternatively, the connecting means may take the form of surfaces which are mutually opposed to one another on the aforesaid wall and edge portion of the respective members, and define a recess therebetween that opens into the edge of the one member at the adjacent face of the other member, and which are accompanied by locking means that are inserted in the recess to prevent the one member from being disengaged from the other member in directions relatively outwardly of the slot in the other member. For instance, in the latter embodiment, the recess may be formed by mitering only one of the surfaces to the plane of the other member, and the locking means may take the form of a dowel which is inserted in a groove in the other surface, along a line parallel to the mitered surface.

In the first embodiment, the mitered surface of the edge portion of the other member may be coincident with one face of the other member, as for example where the one face is tapered to the plane of the other member; or the mitered surface may be recessed into the one face, as for example where the one face is parallel to the plane of the other member.

Preferably, the relatively inside face of the one member is chamfered and the slot of the other member is flush therewith at the chamfered surface of the face. In fact, the relatively inside face of the one member may be tapered to the plane of the one member, and the other wall of the slot in the other member may be similarly tapered inwardly of the faces of the other member from the edge thereof to the bottom of the slot.

BRIEF DESCRIPTION OF THE DRAWINGS

These features will be better understood by reference to the accompaning drawings which illustrate certain of the presently preferred embodiments of the invention.

In the drawings, FIG. 1 is a perspective view of a table constructed from shelves and standards which are engaged and interlocked with one another in joints of the foregoing nature;

FIG. 2 is an exploded view of the table after it has been inverted for ease of illustration;

FIG. 3 is a part elevational view of one standard along the line 3—3 of FIG. 2;

FIG. 4 is a part cross-sectional view of one shelf along the line 4—4 of FIG. 2;

FIG. 5 is a part perspective view of the first step in assembling a shelf and standard at the joint therebetween;

FIG. 6 is another such view of the same step after the shelf and standard have been interengaged with one another;

FIG. 7 is a third such view after the shelf and standard have been subjected to relative rotation to complete the joint;

FIG. 8 is a fourth such view of the completed joint as it is seen from the back side of FIG. 7;

FIG. 9 is a cross-sectional view of the joint along the line 9—9 of FIG. 7;

FIG. 10 is a perspective view of a wall rack constructed from shelves and wall plates which are engaged and interlocked with one another in joints of the foregoing nature;

FIG. 11 is an exploded view of the rack after it has been inverted and tilted forwardly for ease of illustration;

FIG. 12 is a part perspective view of the first step in assembling the shelves and one of the wall plates at the pair of joints therebetween;

FIG. 13 is another such view, showing schematically the second step in assembling the shelves and plate, as well as a full-line view of the assembled joints;

FIG. 14 is a part cross-sectional view along the line 14—14 of FIG. 13;

FIG. 15 is a part perspective view of a modified version of the joint employed in the table and rack of FIGS. 1-14; and FIG. 16 is a part cross-sectional view along the line 16—16 of FIG. 15.

DESCRIPTION OF THE PREFERRED EMBODIMENTS

Referring to the drawings, it will be seen that the table T in FIG. 1 comprises a pair of relatively superposed and individually horizontally disposed shelves 2 which have similar rectangular outlines and are supported in spaced relationship to one another on a set of vertically disposed generally rectangularly outlined standards 4 that are interlocked with the shelves at the corners thereof. The standards are also flush with the outlines of the shelves and are chamfered at their diametrically opposing corners 4' to complement the joints they make with the shelves. The structure which makes these joints possible is seen in FIGS. 2–4, wherein for ease of illustration, the shelves and standards are inverted in relation to the assembled condition thereof in FIG. 1. The upper and lower faces 2' and 2'', respectively, of the shelves coterminate with one another at the outlines of the shelves and define the edges 6 of the shelves therebetween. However, opposing edges of the shelves have slots 8 therein and the walls 10 of the slots are disposed crosswise to the faces 2' and 2'' of the shelves and extend inwardly of the faces from the respective edges 6 of the shelves to the bottoms 12 of the slots. Additionally, the lower faces 2'' of the shelves are rabbeted or countersunk about the walls 10 and bottoms 12 of the slots, and the surfaces of the countersinks 14 are mitered to the horizontal planes of the shelves so that the edge portions of the slots adjacent the walls 10 thereof, have surfaces 16 thereon which taper relatively transversely inwardly of the bodies of the shelves from points adjacent the edges 6 of the shelves to points adjacent the bottoms 12 of the slots. See FIG. 4. Note also that the diametrically opposing corners 18 of the slots are filleted at oblique angles to the bottoms 12 and adjacent walls 10 of the slots.

The outlines of the standards 4 include the chamfered and unchamfered faces 20 and 22, respectively, of the standards, as well as the unchamfered edges 23 defined therebetween. These latter edges 23 have slots 24 therein, the walls 26 of which are disposed crosswise to the faces 20 and 22 of the standards and extend inwardly of the faces from the respective edges 23 of the standards to the bottoms 28 of the slots 24. Additionally, the bottom walls 26 of the slots (which however, are inverted in FIGS. 2–4 as indicated) are mitered to the transverse cross-sectional planes of the standards so that the slots have surfaces 26 thereon adjacent the edges 23 of the standards, which taper relatively longitudinally inwardly of the bodies of the standards from points adjacent the chamfered faces 20 of the standards to points adjacent the unchamfered faces 22 thereof. See FIG. 3. Note also that the standards on corresponding sides of the shelves are reversedly disposed to one another for purposes of engaging them with the corners of the shelves, as shall now be explained.

Referring now to FIGS. 5–9, it will be seen that the shelves and standards are adapted so that the rabbeted edge portions of the shelves at the bottoms 12 of the slots 8 therein, are slidably engageable in the slots 24 of the standards at the ends of the walls 26 adjacent the chamfered faces 20 thereof. On the other hand, the cross-sectional portions of the standards at the bottoms 28 of the slots 24 therein, are more loosely engageable in the slots 8 of the shelves so that the shelves and standards can be interengaged with one another in the manner of FIG. 6, and then relatively rotated through 90° in the manner of FIGS. 6 and 7 to engage the portions 28 of the standards between the walls 10 of the slots 8 and simultaneously interengage the mitered bottom walls 26 of the standards with the mitered bottom surfaces 16 of the shelves. See FIGS. 1, 7 and 8. Note also that the edges 23 and the faces 28 of the standards are substantially flush with the edges 6 of the shelves at the corners thereof, and the chamfered corners 4' and the faces 20 of the standards are substantially flush with the filleted corners 18 and the bottoms 12, respectively, of the slots 8 in the shelves. In short, the standards are effectively dadoed into the slots 8 of the shelves, and at the same time, interlocked with the shelves in the directions outward of the slots 8, by virtue of the part-dovetail tenon and mortise joints achieved between the members at the surfaces 16 and the walls 26. Consequently, the further step of securing the standards to the shelves, for example by driving a nail, screw or other fastener through the portion 18 of each standard, effectively locks the members against disengagement from one another, both longitudinally and transversely of the table T.

The walls 26 and surfaces 16 may have substantially corresponding inclines to the planes of the shelves; or they may have inclines which are adapted to achieve a jam lock or interference fit therebetween. Also, other means, such as adhesives, may be used to secure the standards to the shelves.

Referring now to FIGS. 10–14, it will be seen that the rack R comprises a pair of spaced, relatively superposed and individually horizontally disposed shelves 30 which are rectangularly outlined and cantilevered from a pair of taper sectioned wall plates 32 at the back edges 42 thereof. The shelves are also taper sectioned to lend themselves to the joints made between the plates and the shelves, and in addition, the lower shelf is equipped with a set of projecting pins 34 to render it useful as a hanger if desired. As in the case of the lower walls 26 of the slots 24 in the standards 4 of the earlier embodiment, the lower walls of the pairs of walls 36 in the slots 38 of the plates 32 are mitered to the transverse cross-sectional planes of the plates. However, the relatively adjacent walls of the slots 40 in the shelves, taper reversedly inwardly of the faces 30' and 30'' of the shelves from the edges 42 thereof, and in the directions of the ends of the shelves, so that the recesses of the slots 40 correspond in cross-section to the cross-sections of the plates. Accordingly, when the plates and shelves are interengaged with one another, the plates assume a condition in which the back faces 32'' of the plates are flush with the back edges 42 of the shelves, as well as coplanar with one another. Furthermore, the lower faces 30'' of the shelves are inclined to the planes of the shelves so that when the plates and shelves are interengaged with one another in the manner of FIG. 12, and then swung through a 90° arc as in FIG. 13, the mitered walls 36 of the slots 38 in the plates engage with the tapering edge portions 42 of the lower faces 30'' of the shelves to interlock the plates and shelves with one another, as in the earlier embodiment. See FIG. 14.

Preferably, tapered "thumb print" indentations 44 are relieved from the faces 30'' of the shelves at the bottoms of the slots 40 to facilitate the step of interengaging the shelves and the plates with one another as in FIG. 12. In like fashion, similar indentations may be relieved from the faces 2'' of the shelves 2 in the embodiment of FIGS. 1–9, at the bottoms 12 of the slots 8 therein. If desired, moreover, both walls of the slots 24 and 38 in the respective embodiments can be mitered to achieve a true dovetail effect on swinging the respective members of the embodiments into the interlocked condition thereof.

In FIGS. 15 and 16, a similar effect is achieved, but by a different construction and mode of assembly. Each shelf 46 has flat, parallel, planar upper and lower faces 46' and 46'', and each face has a groove 48 therein adjacent the back edge of the shelf. The grooves 48 extend parallel to the edge but are offset from the edge at differing points so that they lend themselves to the joint achieved in this embodiment. Moreover, the slots 50 in the wall plates 51 are dadoed at acute angles to the planes of the plates, and then dadoed a second time at right angles to the planes of the plates, so that when the shelves and plates are interengaged at right angles to one another, using the slots 52 in the shelves, tapered recesses 54 are formed between the shelves and the mitered walls of the slots 50, and the recesses are disposed opposite the grooves 48 in the shelves. The grooves and recesses in turn provide keyways for pairs of dowels or lock pins 56 which are driven into the recesses along the lengths of the grooves from the open faces of the shelves to interlock the shelves and plates with one another. Subsequently, eyes 58 in the heads of the pins can be employed to withdraw the pins from the recesses when it is desired to disassemble the members.

What is claimed is:

1. A structural joint comprising a pair of structural members, each of which has oppositely disposed faces thereon which coterminate with one another at the outline of the member and define an edge of the member therebetween, which edge has a slot therein, the walls of which are disposed crosswise to the faces of the member and extend inwardly of the faces from the edge to the bottom of the slot, said members being disposed in right angularly related planes and the body of one member being engaged in the slot of the other member and having that edge portion of the other member which is disposed adjacent one wall of the slot therein, received in the slot of the one member, and means connecting the edge portion of the other member with the one member at the slot therein, whereby the one member cannot be disengaged from the other member in the direction outwardly of the slot in the other member.

2. The joint according to claim 1 wherein the connecting means takes the form of surfaces which are mutually opposed to one another on one wall of the slot in the one member, and on the edge portion of the other member, respectively, and which are mitered to the plane of the other member so that they taper relatively transversely inwardly of the body of the other member from points adjacent the edge thereof to points adjacent the bottom of the slot therein.

3. The joint according to claim 1 wherein the connecting means takes the form of surfaces which are mutually opposed to one another on one wall of the slot in the one member, and on the edge portion of the other member, respectively, and which define a recess therebetween that opens into the edge of the one member at the adjacent face of the other member, and locking means that are inserted in the recess to prevent the one member from being disengaged from the other member in directions outwardly of the slot in the other member.

4. The joint according to claim 3 wherein one of the surfaces is mitered to the plane of the other member to form the recess, and there is a dowel inserted in a groove in the other surface, along a line parallel to the mitered surface.

5. The joint according to claim 1 wherein one face of the other member tapers to the plane thereof and the mitered surface of the edge portion of the other member coincides with the one face thereof.

6. The joint according to claim 1 wherein one face of the other member is parallel to the plane thereof and the mitered surface of the edge portion of the other member is recessed into the one face thereof.

7. The joint according to claim 1 wherein the relatively inside face of the one member is chamfered, and the slot of the other member is flush therewith at the chamfered surface of the face.

8. The joint according to claim 1 wherein the relatively inside face of the one member is tapered to the plane of the one member, and the other wall of the slot in the other member is similarly tapered inwardly of the faces of the other member from the edge thereof to the bottom of the slot.

9. In a kit for making up a structural frame, a pair of structural members, each of which has oppositely disposed faces thereon which coterminate with one another at the outline of the member and define an edge of the member therebetween, which edge has a slot therein, the walls of which are disposed crosswise to the faces of the member and extend inwardly of the faces from the edge to the bottom of the slot, the edge portion adjacent one wall of the slot in one member, having a surface thereon which is mitered to the cross-sectional planes of the one member edgewise thereof, so as to taper relatively transversely inwardly of the body of the one member from points adjacent the edge thereof to points adjacent the bottom of said slot therein, and one of the walls of the slot in the other member having a surface thereon which is mitered to the cross-sectional planes of the other member transverse the edge thereof, so as to taper relatively longitudinally inwardly of the body of the other member from points adjacent one face of the other member to points adjacent the other face thereof.

10. In a kit for making up a structural frame, a pair of structural members, each of which has oppositely disposed faces thereon which coterminate with one another at the outline of the member and define an edge of the member therebetween, which edge has a slot therein, the walls of which are disposed crosswise to the faces of the member and extend inwardly of the faces from the edge to the bottom of the slot, the walls of the slot in one of the members having surfaces thereon which are reversedly mitered to the cross-sectional planes of the one member transverse the edge thereof, and the faces of the other member having grooves therein which extend parallel to the edge thereof, but at differing offsets from the edge, and which terminate in the edge portion of the other member adjacent one wall of the slot therein, and a pair of dowels which are adapted to be inserted lengthwise in the grooves and to assume a relatively raised condition with respect to the faces of the other member when so inserted.

* * * * *